(12) United States Patent
Ishikawa et al.

(10) Patent No.: US 8,228,551 B2
(45) Date of Patent: Jul. 24, 2012

(54) IMAGE PROCESSING METHOD AND IMAGE PROCESSING APPARATUS

(75) Inventors: Masaaki Ishikawa, Tokyo (JP); Hiroshi Shimura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 752 days.

(21) Appl. No.: 12/320,313

(22) Filed: Jan. 23, 2009

(65) Prior Publication Data
US 2009/0201538 A1    Aug. 13, 2009

(30) Foreign Application Priority Data
Feb. 7, 2008    (JP) .................................. 2008-027617

(51) Int. Cl.
*G06F 15/00* (2006.01)
(52) U.S. Cl. ...................................................... 358/1.18
(58) Field of Classification Search .................. 358/1.18, 358/3.28
See application file for complete search history.

(56) References Cited

U.S. PATENT DOCUMENTS

| | | | |
|---|---|---|---|
| 6,826,290 B1 * | 11/2004 | Murakami et al. ............ | 382/100 |
| 2003/0012455 A1 | 1/2003 | Olsson et al. | |
| 2004/0258277 A1 * | 12/2004 | Ueda ............................. | 382/100 |
| 2005/0002053 A1 | 1/2005 | Meador et al. | |
| 2005/0173544 A1 | 8/2005 | Yoshida | |
| 2006/0007255 A1 | 1/2006 | Chen | |
| 2007/0133792 A1 | 6/2007 | Utsumi et al. | |
| 2007/0196017 A1 | 8/2007 | Shimazawa et al. | |
| 2007/0247652 A1 | 10/2007 | Akahori | |
| 2008/0240495 A1 | 10/2008 | Abe et al. | |

FOREIGN PATENT DOCUMENTS

| | | |
|---|---|---|
| CN | 1946123 A | 4/2007 |
| CN | 101025604 A | 8/2007 |
| EP | 0366399 | 5/1990 |
| EP | 1691543 | 8/2006 |
| EP | 1703434 | 9/2006 |
| EP | 1786196 | 5/2007 |
| JP | 2003-264684 | 9/2003 |
| JP | 2004-274092 | 9/2004 |
| JP | 2005-079628 | 3/2005 |
| JP | 2007-288691 | 11/2007 |

OTHER PUBLICATIONS

Chinese Office Action dated Jul. 6, 2010.
Extended European Search Report dated Jun. 9, 2009 for corresponding Application No. 09250310.1-2202.
Japanese Office Action for corresponding application No. JP 2008-027617 mailed Dec. 6, 2011.

* cited by examiner

*Primary Examiner* — Saeid Ebrahimi Dehkordy
(74) *Attorney, Agent, or Firm* — Harness, Dickey & Pierce, P.L.C.

(57) ABSTRACT

An image processing apparatus processes image data that contains a confidential image portion. The image processing apparatus includes a receiving unit that receives designation of the confidential image portion; a generating unit that generates specification information that specifies the confidential image portion; an adding unit that adds the specification information to the image data thereby generating first processed image data; and an output unit that outputs the first processed image data.

5 Claims, 12 Drawing Sheets

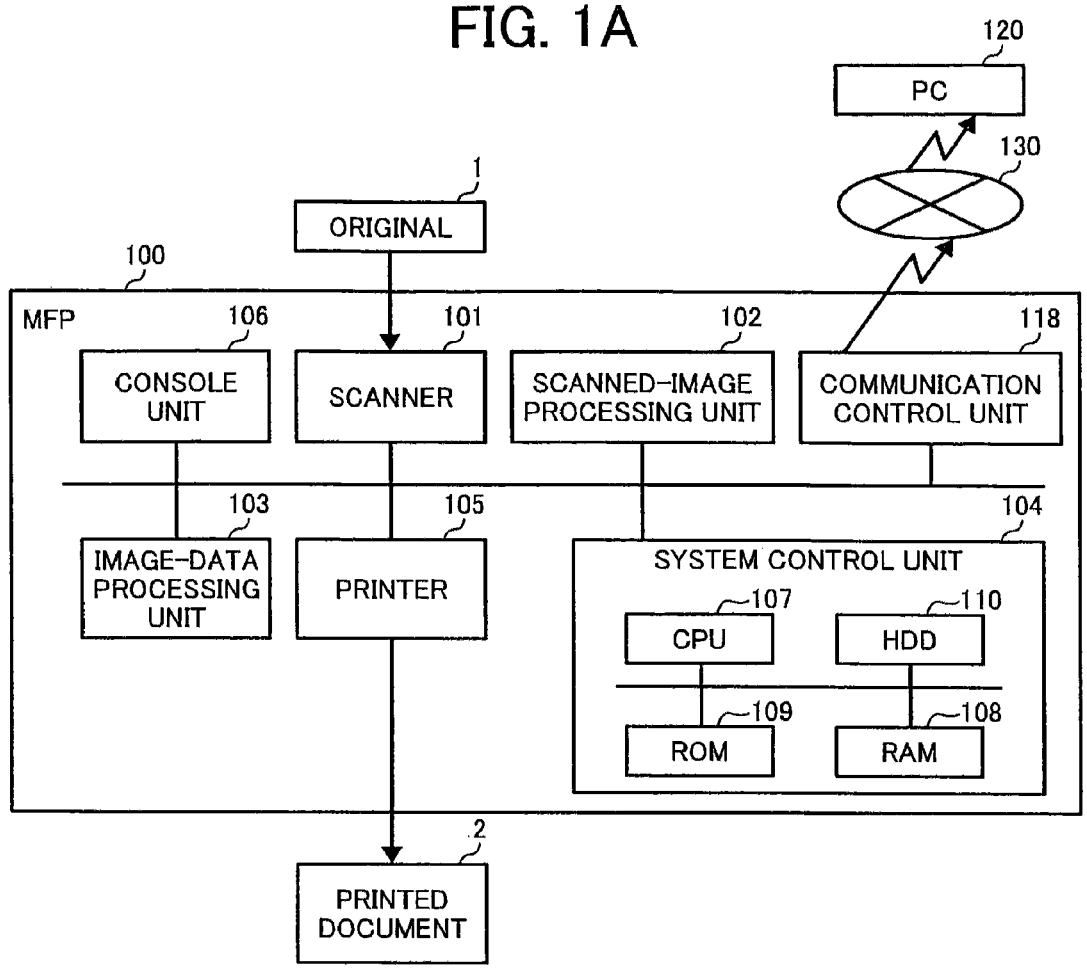
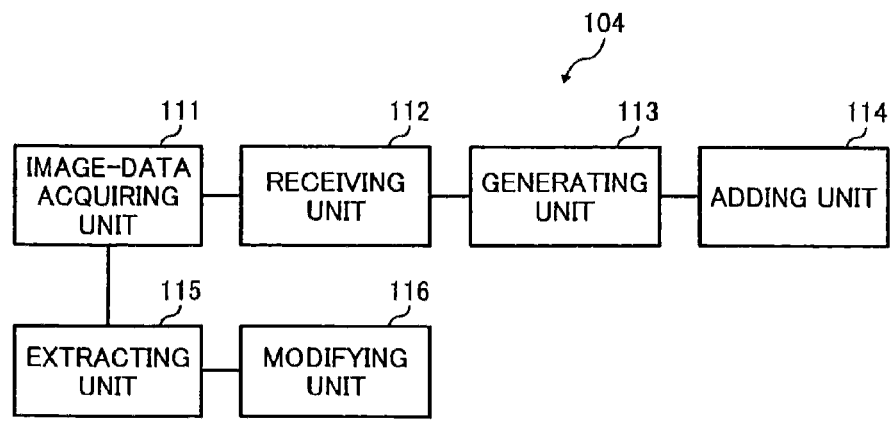

FIG. 2
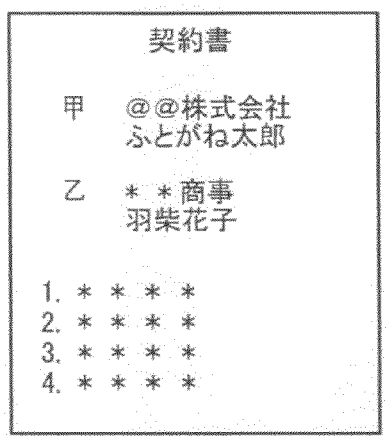
FIG. 3
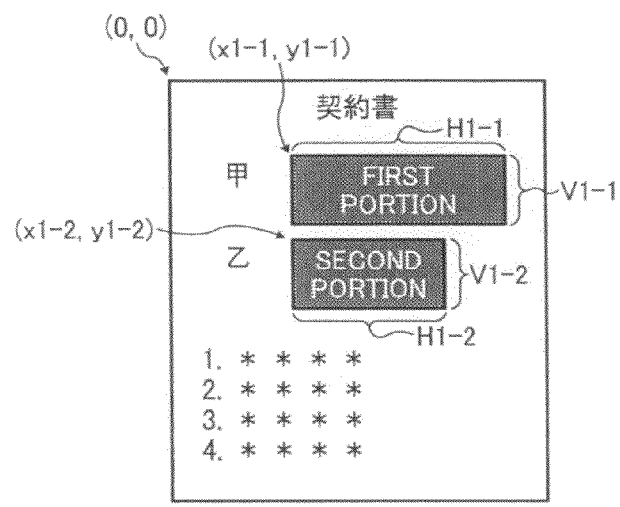
FIG. 4
| IMAGE ID | COORDINATES OF UPPER-LEFT CORNER OF CONFIDENTIAL IMAGE PORTION | LENGTH OF CONFIDENTIAL IMAGE PORTION | WIDTH OF CONFIDENTIAL IMAGE PORTION |
|---|---|---|---|
| 1 | (x1-1, y1-1) | V1-1 | H1-1 |
|   | (x1-2, y1-2) | V1-2 | H1-2 |

BASIC PATTERN

ALTERED PATTERN: BASIC PATTERN ROTATED BY 90 DEGREES WITH ADDITIONAL ONE DOT AT CENTER

IMAGE PROCESSING METHOD AND IMAGE PROCESSING APPARATUS

CROSS-REFERENCE TO RELATED APPLICATIONS

The present application claims priority to and incorporates by reference the entire contents of Japanese priority document 2008-027617 filed in Japan on Feb. 7, 2008.

BACKGROUND OF THE INVENTION

1. Field of the Invention

The present invention relates to a technology for processing an image.

2. Description of the Related Art

Recent progress in technologies related to image processing and image forming has made it possible to make a genuine-looking reproduction of a banknote or the like by using a digital color copier. Sometimes, copies (reproduction) of banknotes made with such digital color copier can hardly be distinguished from the real banknotes. To this end, there are demands for a copy-resistant system that totally prohibits reproduction, or prevents correct reproduction, of special originals such as banknotes and securities.

Targets of the copy-resistant system are not limited to bank notes. For example, in offices, there are a number of documents categorized as confidential documents of which reproduction needs to be prohibited to keep trade secrets. Measures for totally prohibiting reproduction, or preventing correct reproduction, of these confidential documents are also required.

Under these circumstances, various developments have been made to restrict reproduction of these special originals and confidential documents. Japanese Patent Application Laid-open No. 2004-274092 discloses a technique that prohibits, when a scanned image is determined to include a predetermined dot pattern, output (printing) of the scanned image. The predetermined dot pattern is embedded in the document in advance.

With the technique disclosed in Japanese Patent Application Laid-open No. 2004-274092, a confidential document can be distinguished from a non-confidential, general document, and output of the whole area of the confidential document can be prevented. However, it is not possible to output only a confidential portion, such as a portion related to personal privacy, of a document.

SUMMARY OF THE INVENTION

It is an object of the present invention to at least partially solve the problems in the conventional technology.

According to an aspect of the present invention, there is provided an image processing apparatus that processes image data that contains a confidential image portion. The image processing apparatus includes a receiving unit that receives designation of the confidential image portion; a generating unit that generates specification information that specifies the confidential image portion; an adding unit that adds the specification information to the image data thereby generating first processed image data; and an output unit that outputs the first processed image data.

According to another aspect of the present invention, there is provided an image processing apparatus that processes image data that contains a confidential image portion, the image data including specification information about the confidential image portion. The image processing apparatus includes an extracting unit that extracts the specification information from the image data; a modifying unit that generates second processed image data by modifying the confidential image portion specified by the specification information extracted by the extracting unit; and an output unit that outputs the second processed image data.

According to still another aspect of the present invention, there is provided an image processing method of processing image data that contains a confidential image portion. The image processing method includes receiving designation of the confidential image portion; generating specification information that specifies the confidential image portion; adding the specification information to the image data thereby generating first processed image data; and outputting the first processed image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A is a block diagram of an MFP according to a first embodiment of the present invention;

FIG. 1B is a functional block diagram of a system control unit shown in FIG. 1A;

FIG. 2 is a schematic diagram for explaining image data acquired by an image-data acquiring unit shown in FIG. 1B;

FIG. 3 is a diagram for explaining position information about a confidential image portion in the image data shown in FIG. 2;

FIG. 4 is an example of a mapping table of an image ID and position information about a confidential image portion shown in FIG. 3;

DETAILED DESCRIPTION OF THE PREFERRED EMBODIMENTS

Figure 5A:
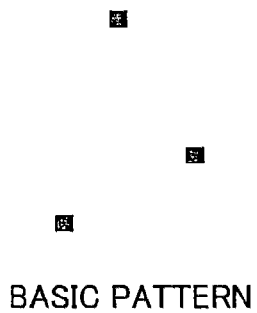
FIG. 5A is a schematic diagram of an example of a basic pattern for a background pattern generated by a generating unit shown in FIG. 1B.

Exemplary embodiments of the present invention are described in detail below with reference to the accompanying drawings.

A first embodiment of the present invention will be described below. The first embodiment is what-is-called a digital multifunction product (MFP) that serves as a copier, printer, a scanner, a distributing machine that distributes images such as an image of an original scanned by the scanner and an image received from the printer, and/or the like. In the following description, it is assumed that an MFP 100 according to the first embodiment is an image processing apparatus or a server; however, the MFP 100 is not limited thereto. The MFP 100 can be a copier, printer, a facsimile machine, or the like.

FIG. 1A is a block diagram of the MFP 100 along with some related external devices. The MFP 100 includes a scanner 101, a scanned-image processing unit 102, an image-data processing unit 103, a system control unit 104, a printer 105, a console unit 106, and a communication control unit 118. The system control unit 104 controls operations of the scanner 101, the scanned-image processing unit 102, the image-data processing unit 103, the printer 105, the console unit 106, and the communication control unit 118. The MFP 100 is connected to an external device such as a personal computer (PC) 120 via a network 130. The network 130 can be the Internet. The scanner 101 scans an original 1 and obtains image data. The image data is processed and then sent to the printer 105 for printing. The printer 105 prints the processed image data on a printing medium, such as paper, and outputs the printing medium as a printed document 2.

The scanner 101 converts an image of the original 1 into digital image data. The scanner 101 according to the first embodiment includes an automatic document feeder (ADF) (not shown). The ADF is capable of feeding one sheet at a time of the sheets of a multiple-sheet original to a scanning position of the scanner 101. Accordingly, by using the ADF, the scanner 101 can scan multiple pages of an original automatically continuously. Because the ADF is also capable of reversing an original and feeding the reversed original to the scanner 101, it is possible to cause the scanner 101 to automatically scan a double-sided original. The scanner 101 sends the scanned digital image data to the scanned-image processing unit 102.

The scanned-image processing unit 102 performs gamma correction and modulation transfer function (MTF) correction on the digital image data received from the scanner 101. The scanned-image processing unit 102 then performs tone processing such as level slicing and dithering on the image data to convert the image data into binary (or multi-level) data, and sends the binary data to the image-data processing unit 103.

The image-data processing unit 103 receives instructions from the system control unit 104 and performs various processes on the image data received from the scanned-image processing unit 102 or image data to be output to the PC 120 according to parameters set by a user. Examples of the processes include various image processing operations, image-area editing operations, and layout-related operations. More specifically, the image processing operations include enlargement/reduction, adjustment of image density and color, and the like. The image-area editing operations include deletion, displacement, reversing of an image area, and the like. The layout-related operations include selection of double-sided/single-sided printing, multiple-up printing, adjustment of margin, and the like.

The printer 105 is an electro-photographic printer. The printer 105 causes light beam to be deflected according to the image data processed by the image-data processing unit 103 so that a latent image is formed on a photosensitive member. The latent image is developed with toner. The toner image is then transferred onto a printing medium, and fixed onto the printing medium. The printer 105 is not limited to an electro-photographic printer. The printer 105 can be, for example, an inkjet printer, a sublimatic printer, a silver-halide photographic printer, a thermo-autochrome printer, or a thermo-fusible transfer printer.

The console unit 106 receives input of various data or parameters from a user via a touch panel (not shown), and displays a menu list and the like. A user enters (or selects) parameters related to processing to be performed by the MFP 100 on image data from the menu list.

The console unit 106 displays a list of functions that can be performed by the MFP 100 as a menu list on a configuration screen. When a user selects and enters an item from the menu list, the console unit 106 acquires a value of the item. More specifically, when a touch panel is contacted by a pointer (not shown), the console unit 106 obtains coordinates of a position at which the pointer contacts the touch panel. When the position is determined to be within a selectable area, the console unit 106 determines that an item corresponding to the coordinates is selected, and accepts the value of the item.

The touch panel electrically, or magnetically, detects a position at which the pointer touches the panel. Examples of the pointer include a fingertip of a user, stylus pens, and other touch input devices. In other words, a user enters various parameters including parameters related to print settings by contacting the touch panel via a pointer.

The first embodiment will be described by way of an example in which inputs are entered via a touch panel; however, embodiments of the present invention are not limited to touch input. For example, the console unit 106 can include, in place of the touch panel, hard keys via which a user can enter input for, e.g., starting printing by physically operating the keys.

The communication control unit 118 controls communications between the MFP 100 and the PC 120 that are connected together via the network 130. More specifically, the communication control unit 118 outputs image data processed by the image-data processing unit 103 to the PC 120.

The system control unit 104 is connected to various units of the MFP 100 and controls these units. For example, the system control unit 104 provides the scanner 101 with information about a scanning area appropriate for the paper size selected by the user. The system control unit 104 includes a central processing unit (CPU) 107, a random access memory (RAM) 108, a read only memory (ROM) 109, and a hard disk drive (HDD) 110. The system control unit 104 performs the various control operations by causing the CPU 107 to execute computer programs stored in the HDD 110 by utilizing working memory in the RAM 108.

The computer programs can be provided in a computer-readable recording medium such as a compact disc-read-only memory (CD-ROM), a flexible disk (FD), a compact disc recordable (CD-R), or a digital versatile disk (DVD) in an installable or executable format. In this case, the CPU 107 of the system control unit 104 reads the computer programs from the recording medium and loads them into a main storage unit (the HDD 110) so as to perform various functions. The computer programs can be stored in, in place of the recording medium, the PC 120. In this case, the computer programs can be downloaded from the PC 120 into the HDD 110.

From among the various functions to be performed by the CPU 107 by using the computer programs, features of the MFP 100 according to the first embodiment will be described with reference to FIG. 1B. FIG. 1B is a functional block diagram of the system control unit 104.

The CPU 107 provides functions of an image-data acquiring unit 111, a receiving unit 112, a generating unit 113, an adding unit 114, an extracting unit 115, and a modifying unit 116 by executing the computer programs.

A scheme for adding information to image data to be output will be described below.

The image-data acquiring unit 111 acquires image data that is input to the system control unit 104 so as to be processed by the MFP 100. Examples of the image data include image data obtained by the scanner 101 and image-processed by the scanned-image processing unit 102 and the image-data processing unit 103, image data received from the PC 120 and image-processed by the image-data processing unit 103, and image data stored in a storage device (e.g., the HDD 110) or the like in the MFP 100.

The receiving unit 112 receives designation from a user of a confidential image portion of image data received by the image-data acquiring unit 111. The confidential image portion is a portion that has confidential information such as confidential information in a confidential document. In the first embodiment, the receiving unit 112 receives the designation entered via the console unit 106; however, the designation can be received by other method. For example, the designation can be received from the PC 120.

Meanwhile, the image-data acquiring unit 111 according to the first embodiment can acquire designated image data. The designated image data is image data that has a solidly filled region (hereinafter, "filled region"). When the image-data acquiring unit 111 acquires designated image data, the receiving unit 112 extracts the filled region from the image data by using the technique of region extraction. The receiving unit 112 can receive the filled region as designation of a confidential image portion. In this case, the receiving unit 112 extracts the filled region by extracting a rectangular region of a size larger than the filled region from the image data.

FIG. 2 is a schematic diagram of an example of image data acquired by the image-data acquiring unit 111. A user designates the confidential image portion in this image data via the console unit 106.

The receiving unit 112 performs mapping between position information and identification information about the designated confidential image portion, and stores these information pieces in the HDD 110. The position information is for use in specification of a position of the confidential image portion in the image data. For example, the position information can be the coordinates of the confidential image portion in the image data, a character string in the confidential image portion, or the like. FIG. 3 is a schematic diagram for explaining position information about the confidential image portion in the image data shown in FIG. 2. In the first embodiment, the position information includes the coordinates (x, y) of the upper left corner, the length (V), and the width (H) of the confidential image portion. The coordinates (x, y) are taken with reference to the upper left corner (0, 0) of the image data. The position information is mapped to identification information, and stored in the HDD 110. In the example shown in FIG. 3, position information (x1-1, y1-1), the length (V1-1), and the width (H1-1) of a first portion and position information (x1-2, y1-2), the length (V1-2), and the width (H1-2) of a second portion are mapped to the identification information, and stored in the HDD 110.

In the first embodiment, the position information about the confidential image portion includes the coordinates (x, y) of the upper left corner, the length (V), and the width (H) of the confidential image portion. However, the position information can be any other information by which a position of a confidential image portion in image data can be specified. For example, the position information can be the coordinates of a confidential image portion relative to an upper-left reference element of image data. The upper-left reference element can be, for example, a first-detected black pixel among pixels that are detected during image data scanning which is performed from the upper left corner of the image data. It is preferable to set a size of the reference element pixel to be larger than a predetermined size. By setting the size of the reference element pixel in this manner, undesirable detection of a noise pixel as the reference element can be prevented.

The identification information includes, for example, information (hereinafter, "image ID") by which image data that includes a designated confidential image portion can be identified, and information (hereinafter, "portion ID") by which the confidential image portion can be identified. The image ID typically includes a page number pertaining to the image data that includes the designated confidential image portion, and the like. The portion ID typically includes the page number and a number allocated to the confidential image portion. FIG. 4 is an example of a mapping table of the image ID and the position information about the confidential image portion. Upon receiving designation of a confidential image portion, the receiving unit 112 generates a table that maps identification information to position information about the confidential image portion as shown in FIG. 4, and stores the table in the HDD 110.

The generating unit 113 generates specification information that specifies the confidential image portion designation of which has been received by the receiving unit 112. The specification information is the image ID that is mapped to the position information and stored in the HDD 110. In the first embodiment, the specification information is the image ID; however, the specification information is not necessarily the image ID. For example, the specification information can be the portion ID. As described above, according to the first embodiment, the image ID, the portion ID, or like data that is small in data size is used as the specification information. Accordingly, the specification information can be detected quickly.

Figure 5B:
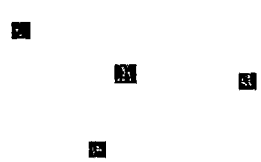
FIG. 5B is a schematic diagram of an example of an altered pattern for the background pattern.

The generating unit 113 generates a background pattern that represents specification information. More specifically, the generating unit 113 generates a background pattern that represents specification information as a correlation between two predetermined patterns. FIG. 5A is a schematic diagram of an example of a basic pattern for a background pattern according to the first embodiment. The basic pattern includes three dots. FIG. 5B is a schematic diagram of an example of an altered pattern for the background pattern. The altered pattern includes four dots. More specifically, the altered pattern includes three dots of the basic pattern rotated by 90 degrees and additional one dot at the center.

The generating unit 113 generates a background pattern by placing equal numbers of basic patterns and altered patterns in a repetitive pattern. The background pattern represents specific information as an angular difference between the basic pattern and the altered pattern. It is preferable to quantize possible angular differences between the basic pattern and the altered pattern to improve accuracy in detection of the specific information. In the first embodiment, an angular range of 180 degrees is quantized to 8 angular ranges (8 angular difference levels) of 22.5 degrees each. Hence, the background pattern has 3-bit information as the specific information. FIG. 5B is a schematic diagram of the altered pattern that has an angular difference of 90 (22.5×4) degrees (i.e., 4 angular difference levels) relative to the basic pattern shown in FIG. 5A.

The number of the angular difference levels (or angular difference) between the basic pattern and the altered pattern can be used to represent information. When, for example, N, which is the number of angular difference levels, is assumed to represent a number N without requiring conversion, "0" can be represented by arranging the basic pattern and the altered pattern to be parallel to each other. Similarly, each of "1", "2", "3", "4", "5", "6", "7", and "8" can be represented by arranging these patterns to have a corresponding number of angular difference levels.

The adding unit 114 generates first processed image data by adding the specification information generated by the generating unit 113 to the image data. In the first embodiment, the adding unit 114 adds an image ID to the image data acquired by the image-data acquiring unit 111 to generate first processed image data.

Figure 6:
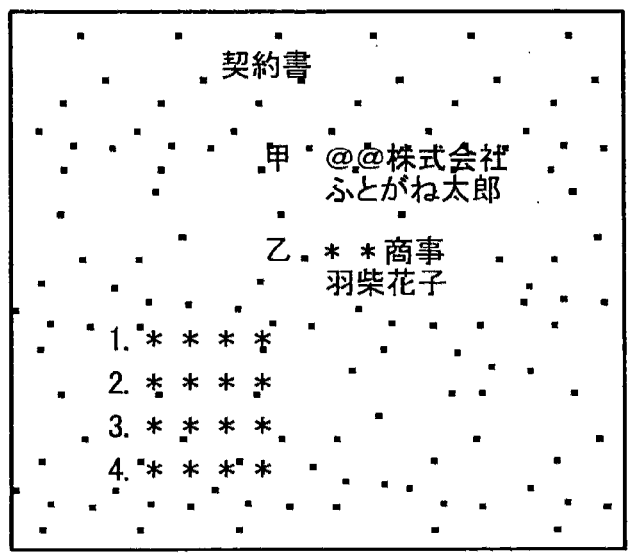
FIG. 6 is a schematic diagram of processed image data on which a background pattern is superimposed.

Alternatively, the adding unit 114 can add the specification information to the acquired image data by superimposing, on the image data, the background pattern that is generated by the generating unit 113 and that represents the specification information. FIG. 6 is a schematic diagram for explaining image data on which a background pattern is superimposed.

When the specification information is to be represented only by a relative angular difference between the basic pattern and the altered pattern, the background pattern can be arranged at any position on the image data so long as both the basic pattern and the altered pattern are superimposed on the image data.

The structure for detecting information added to image data to be output will be described below.

The extracting unit 115 extracts, from image data acquired by the image-data acquiring unit 111, specification information that specifies a confidential image portion in the image data. More specifically, the extracting unit 115 performs image processing such as optical character recognition (OCR) to extract an image ID expressed as a character string from image data. In the first embodiment, the extracting unit 115 extracts an image ID expressed as a character string; however, an image ID can be extracted by some other method. For example, the extracting unit 115 can extract an image ID by using a paper fiber pattern (hereinafter, "paper fingerprint") of a paper sheet on which the original of the image data is printed. The paper fingerprint is a fine pattern that is developed during a course of paper making and that is intrinsic to each paper sheet. Japanese Patent Application Laid-open No. 2006-245949, for example, discloses the paper fingerprint technique. With this technique, each paper sheet can be identified by using a surface profile (e.g., fine projections or depressions on the surface of the paper sheet) and a thickness profile of the paper sheet. Using such a paper fingerprint to extract an image ID eliminates the need of performing image processing such as OCR.

If a background pattern that represents specification information is superimposed on image data, the extracting 115 detects the background pattern, and extracts the specification information represented by the background pattern. The extracting unit 115 can detect a background pattern by using a conventional method, such as pattern matching, for digitally detecting the background pattern. When a background pattern is to be detected by pattern matching, pattern images that represent at least one basic pattern and at least one altered pattern can be stored in the HDD 110 in advance. The extracting 115 can detect a background pattern that includes the basic pattern and the altered pattern by using the pattern images.

Alternatively, the extracting unit 115 can detect a background pattern by using a feature value of the basic pattern and the altered pattern. More specifically, the extracting unit 115 can determine that a background pattern has the basic pattern and the altered pattern when a feature value of the background pattern satisfies a predetermined value. The feature value can be, for example, a distance value between dots in a basic pattern and dots in an altered pattern. In this case, an inter-dot distance of a background pattern of image data is calculated as the feature value. The calculated feature value is compared to a feature value of the basic pattern and the altered pattern having been stored in the HDD 110 in advance. When the calculated feature value and the stored feature value are found to be equal to each other, the extracting unit 115 determines that the background pattern includes the basic pattern and the altered pattern.

In this manner, in the first embodiment, information is represented by the angular difference between the basic pattern and the altered pattern. The basic pattern and the altered pattern are detected by using pattern images or a feature value of the pattern images that have been stored for each of quantized angular difference levels.

In the first embodiment, the extracting unit 115 extracts specification information represented by the background pattern based on an angular difference between the basic pattern and the altered pattern detected by pattern matching or the like. The angular difference can be obtained as a statistic peak value of angular differences of all of basic patterns and altered patterns. In the first embodiment, an image ID is extracted as the specification information; however, the specification information is not limited to an image ID. For example, in place of the image ID, a portion ID or the like can be extracted as the specification information.

When the number of the angular difference levels is assumed to represent a number without requiring conversion, the specification information can be defined as follows:

$$c = |a-b| \text{Mod} 180/22.5$$

where "c" is the number of the angular difference levels, "a" is the angle of the basic pattern, "b" is the angle of the altered pattern, and Mod is the remainder. In this example, quantization is performed to give a single angular difference level of 22.5 degrees.

Substituting "0" for "a", which is the angle of the basic pattern, and 22.5 for "b", which is the angle of the altered pattern, yields the following result:

$$c = |0 - 22.5| \text{Mod} 180/22.5 = 1$$

The resultant value of "1" is the specification information.

In the first embodiment, a confidential image portion is specified by position information (the coordinates of the upper left corner, the length, and the width of the confidential image portion). The position information is mapped to an image ID, which is the specification information, and stored in the HDD 110. The modifying unit 116 generates second processed image data by modifying the confidential image portion specified by the specification information extracted by the extracting unit 115.

The modifying unit 116 can modify the confidential image portion by using various methods. For example, the modifying unit 116 can replace pixel values of the confidential image portion to a pixel value of a background color (e.g., to white pixels when the background color of the image data is white) or a pixel value of a predetermined color (e.g., to black pixels). Alternatively, the modifying unit 116 can replace the confidential image portion to an image of predetermined characters. For example, the modifying unit 116 can replace the confidential image portion to an image of a fixed sentence such as "Information in this portion is masked." The modifying method to be used by the modifying unit 116 and the position information about the confidential image portion can be stored in the HDD 110 in advance as being mapped to the identification information.

Figure 7:
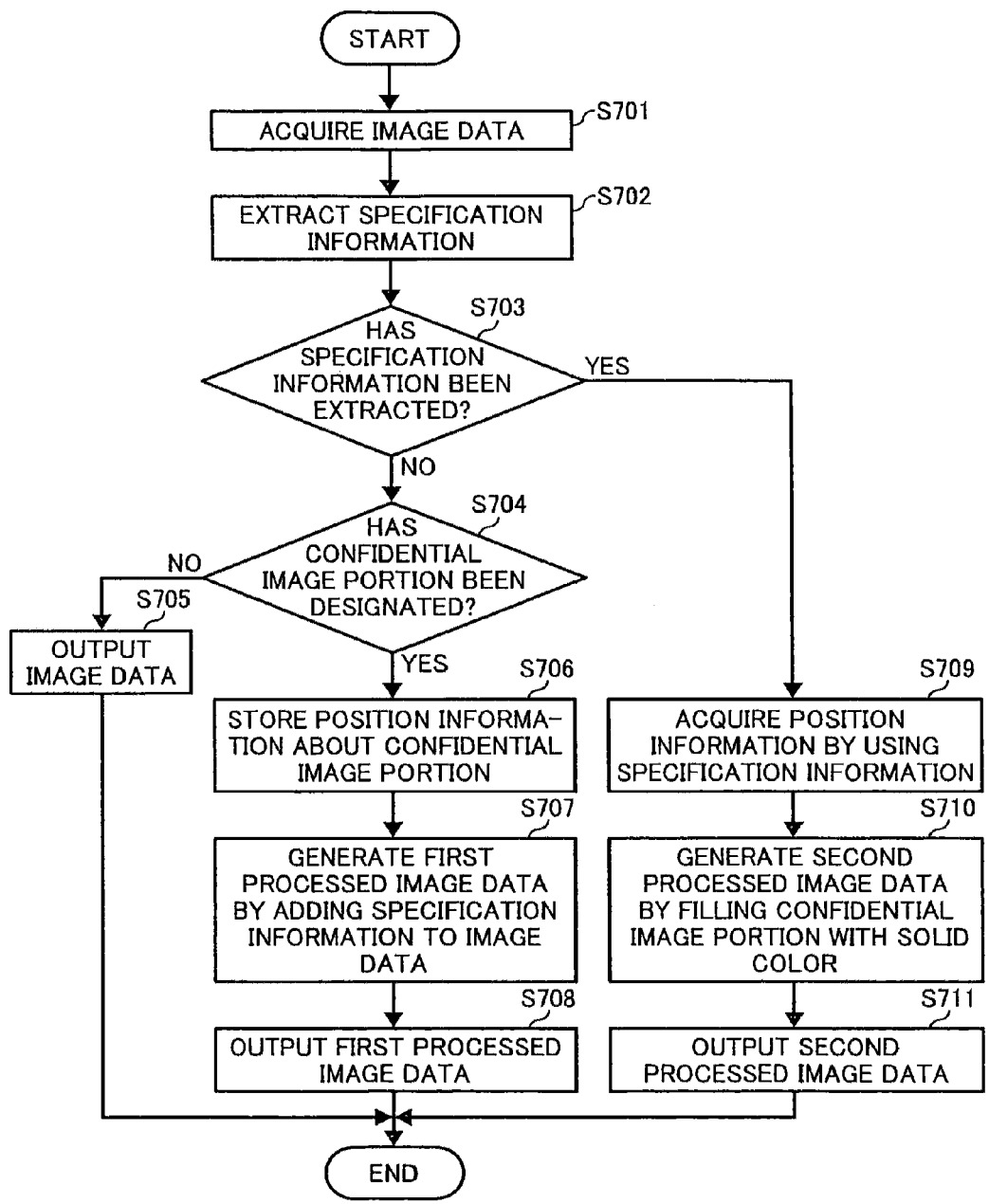
FIG. 7 is a flowchart for explaining how the MFP shown in FIG. 1 performs printing.

How the MFP 100 performs printing will be described below. FIG. 7 is a flowchart for explaining how the MFP 100 performs printing.

The image-data acquiring unit 111 acquires scanned image data from the scanner 101 or receives image data from the PC 120 (Step S701). The extracting unit 115 extracts specification information from the acquired image data (Step S702).

When the extracting unit 115 cannot extract specification information from the acquired image data (NO at Step S703), the receiving unit 112 waits for a user to designate a confidential image portion (Step S704). When a confidential image portion is not designated by a user (NO at Step S704), the printer 105 outputs the acquired image data as a printout on a printing medium (Step S705).

When a confidential image portion is designated by a user (YES at Step S704), the receiving unit 112 maps position information about the confidential image portion to an image ID, and stores these information pieces in the HDD 110 (Step S706). The adding unit 114 generates first processed image data by adding specification information generated by the generating unit 113 to the image data (Step S707). The printer 105 outputs the first processed image data as a printout on a printing medium (Step S708).

When the extracting unit 115 extracts specification information from the acquired image data (YES at Step S703), the modifying unit 116 fetches from the HDD 110 position information having been stored in the HDD 110 as being mapped to the specification information (image ID) (Step S709). The modifying unit 116 generates second processed image data by modifying (filling with solid color) the confidential image portion specified by the position information (Step S710). The printer 105 outputs the second processed image data as a printout on a printing medium (Step S711).

In the first embodiment, each of the image data and the processed image data is fed to the printer 105 and printed on a printing medium; however, the output method is not limited to printing. For example, at least one of the image data and the processed image data can be transmitted to the PC 120 via the communication control unit 118.

In this manner, according to the first embodiment, image data that has a confidential portion can be output with only the confidential image portion modified.

A modification of the first embodiment will be described below. Because the structure and functions of an MFP according to this modification are substantially the same as those of the first embodiment, only elements that differ from those of the first embodiment will be described. The MFP according to this modification adds, to image data, position information about a confidential image portion of the image data as the specification information. Because it is not necessary to store the position information in the HDD 110 in advance, an HDD having a smaller memory capacity can be used as the HDD 110.

The generating unit 113 generates the specification information, which is the position information about the confidential image portion, by using a background pattern that has a basic pattern and an altered pattern. Accordingly, the receiving unit 112 according to this modification is not required to store the position information in the HDD 110.

The extracting unit 115 according to this modification extracts the specification information, which is the position information, from image data. More specifically, the extracting unit 115 extracts the position information added to the image data based on an angular difference between the basic pattern and the altered pattern. The angular difference is determined by using pattern matching or the like method.

The modifying unit 116 generates second processed image data by modifying the confidential image portion specified by the position information extracted by the extracting unit 115.

An MFP 900 according to a second embodiment of the present invention will be described below. Because the structure and functions of the MFP 900 are substantially the same as those of the MFP 100 according to the first embodiment, only elements that differ from those of the first embodiment will be described. The MFP 900 adds, to the image data, specification information that includes identification information and orientation information about image data that has a confidential image portion. Accordingly, the MFP 900 can determine whether the image data that is to be output from the MFP 900 is correctly oriented.

The MFP 900 corrects inappropriate orientation of image data. More specifically, when acquired image data is inverted or inappropriately oriented, the MFP 900 calculates a rotation angle of the image data and corrects the inverted or inappropriate orientation by using a skew correction method or the like based on the result of calculation. By correcting the inverted or inappropriate orientation in this manner, even when acquired image data is inverted or inappropriately oriented by malicious intention, it is possible to accurately modify a specified confidential image portion of the image data.

Figure 8B:
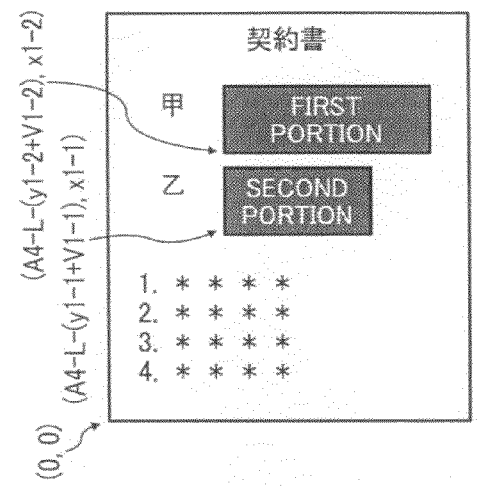
FIGS. 8A to 8D are schematic diagrams for explaining image data having different orientation.
Figure 8D:
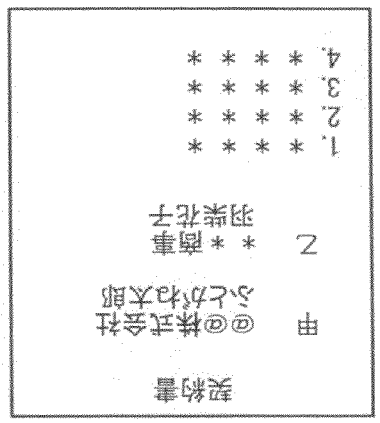
Figure 8A:
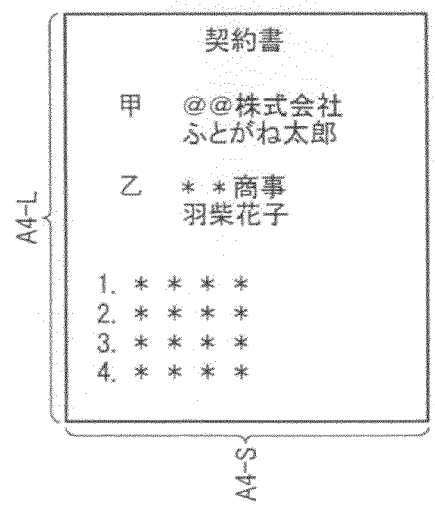
Figure 8C:
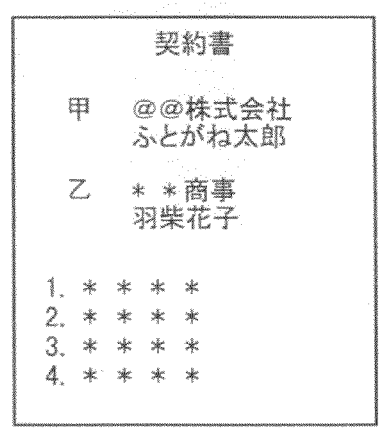

For example, when the original 1 shown in FIG. 2 is scanned by the scanner 101 in portrait orientation for A4-sized sheet, and designation for the confidential image portions (the first portion and the second portion) shown in FIG. 3 is received by the receiving unit 112, the table shown in FIG. 4 is stored in the HDD 110. However, when an original that has the specific information shown in FIG. 4 is scanned in an orientation shown in FIG. 8A, position information changes as shown in FIG. 8B. More specifically, the position information about the confidential image portions with reference to the upper-left corner (0, 0) of the image data differs from the position information shown in FIG. 4. Similarly, as shown in FIG. 8C and FIG. 8D, when the background pattern that represents the specification information is superimposed on the image data in a first orientation and the background pattern is detected in an inverted orientation of the first orientation, the position information changes. FIGS. 8A to 8D are diagrams for explaining images for which image data are identical to one another but differ from one another in orientation.

Figure 9:
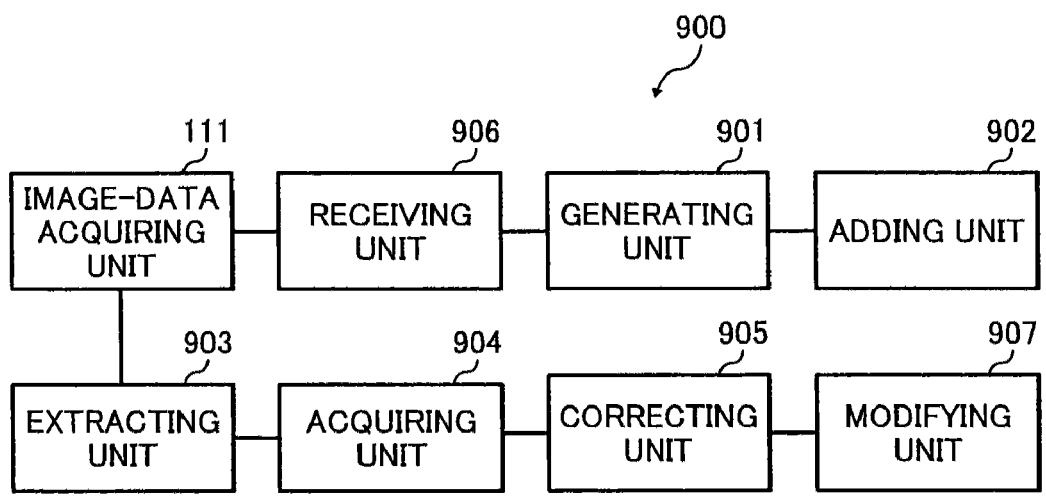
FIG. 9 is a functional block diagram of an MFP according to a second embodiment of the present invention.

Features of the MFP 900 will be described below. FIG. 9 is a functional block diagram of the MFP 900. The MFP 900 according to the second embodiment differs from the MFP 100 according to the first embodiment on processing performed by a receiving unit 906, a generating unit 901, an adding unit 902, an extracting unit 903, and a modifying unit 907 and in that the MFP 900 further includes an acquiring unit 904 and a correcting unit 905.

The receiving unit 906 performs mapping among identification information, position information about a confidential image portion, and first orientation information about image data that has a confidential image portion. In this example, the first orientation information indicates an inclination angle or a rotation angle of the image data. In the second embodiment, the first orientation information is assumed to be zero degrees. The first orientation information is stored in the HDD 110 as being mapped to identification information.

Figure 10:
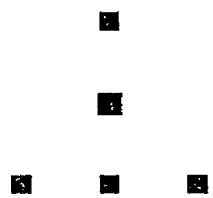
FIG. 10 is a diagram for explaining an orientation indicating pattern generated by the MFP shown in FIG. 9.

The generating unit 901 generates specification information that includes identification information and first orientation information. In this example, the generating unit 901 generates specification information by using a background pattern. More specifically, the generating unit 901 generates a background pattern that has, in addition to a basic pattern and an altered pattern that represent identification information, an orientation indicating pattern. FIG. 10 is a diagram of an example of the orientation indicating pattern. In the second embodiment, the generating unit 901 generates a background pattern that has the orientation indicating pattern shown in FIG. 10 at four corners or at predetermined positions of image data. The first orientation information represented by the orientation indicating pattern is mapped to the image ID shown in FIG. 4 and position information about the confidential image portion, and stored in the HDD 110. The first orientation information, which represents an inclination angle or a rotation angle of the image data, is an angle of the orientation indicating pattern. The angle of the orientation indicating pattern shown in FIG. 10 is zero degrees, which means that the image data is not inclined or rotated.

Figure 11:
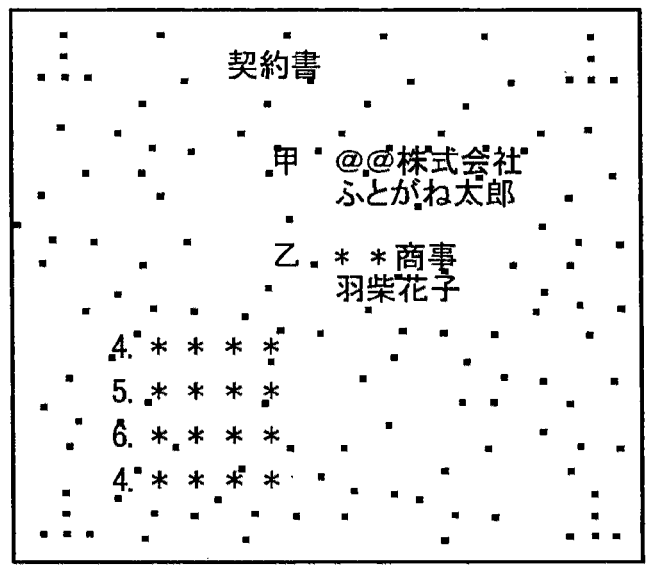
FIG. 11 is a schematic diagram of processed image data on which a background pattern is superimposed.
Figures 12A, 12B:
FIGS. 12A to 12D are schematic diagrams for explaining pattern images.
Figures 12C, 12D:

The adding unit 902 generates first processed image data by adding a background pattern that has a basic pattern and an altered pattern to the image data. FIG. 11 is a schematic diagram of an example of second processed image data that includes a background pattern superimposed thereon. The background pattern in the image data has an orientation indicating pattern. The orientation indicating pattern indicates that the image data is not inclined or rotated (zero degrees).

The extracting unit 903 extracts, from image data acquired by the image-data acquiring unit 111, identification information and second orientation information mapped to position information about a confidential image portion as specification information. In the second embodiment, the extracting unit 903 detects a basic pattern, an altered pattern, and an orientation indicating pattern by using pattern images having been stored in the HDD 110 in advance. The pattern images represent the basic pattern, the altered pattern, and the orientation indicating pattern. In a manner similar to that performed by the extracting unit 115 according to the first embodiment, the extracting unit 903 can detect a background pattern by using, in place of the pattern images, a feature value of the basic pattern, the altered pattern, and the orientation indicating pattern.

In this example, the extracting unit 903 detects an orientation indicating pattern and extracts the second orientation information from an angle indicated by the orientation indicating pattern. The orientation indicating pattern can be detected by using pattern images having been stored in a storage device in advance. Examples of the pattern images are shown in FIGS. 12A to 12D. In place of the pattern images, a feature value of the pattern images can be stored. FIG. 12A, FIG. 12B, FIG. 12C, and FIG. 12D are pattern images of an orientation indicating pattern rotated by 0 degrees, the orientation indicating pattern rotated by 90 degrees, the orientation indicating pattern rotated by 180 degrees, and the orientation indicating pattern rotated by 270 degrees, respectively. The extracting unit 903 determines which one of the pattern images shown in FIG. 12A to 12D matches the detected orientation indicating pattern, and extracts the second orientation information based on the pattern image.

In the second embodiment, the second orientation information is obtained by using the pattern images of the orientation indicating patterns in this manner; however, the method of obtaining the second orientation information is not limited thereto. For example, the second orientation information can be obtained from an inclination angle of the basic pattern. The inclination angle can be determined by comparing the basic pattern detected by the extracting unit 903 to pattern images having been stored in a storage device in advance. The pattern images can be images of the basic pattern rotated by 90 degrees, the basic pattern rotated by 180 degrees, and the basic pattern rotated by 270 degrees. The inclination angle can be determined by comparing a feature value of the basic pattern to a feature value of the pattern images having been stored in advance.

The acquiring unit 904 acquires a rotation angle of the image data based on the second orientation information extracted by the extracting unit 903 and the first orientation information having been stored in the HDD 110 as being mapped to the identification information that is detected by the extracting unit 903. In the second embodiment, the rotation angle of the image data is calculated as a difference (rotation angle) between the rotation angle (0 degrees) of the first orientation information stored in the HDD 110 and a rotation angle of the second orientation information detected by the extracting unit 903.

The correcting unit 905 corrects orientation of the image data by using the calculated rotation angle. In the second embodiment, the correcting unit 905 corrects inappropriate orientation of the image data by a skew correction method or the like based on the rotation angle. Because the inappropriate orientation can be corrected by a generally used skew correction or the like method, description about the correction method is omitted.

The modifying unit 907 generates second processed image data by modifying the confidential image portion specified by the position information stored in the HDD 110 as being mapped to the identification information.

In the second embodiment, the confidential image portion is modified by the MFP 900; however, the modification can be performed by some other device. For example, when the MFP 900 has the functions of a server device, the confidential image portion can be modified by an external device connected to the MFP 900. In this case, the MFP 900 receives image data from the external device (e.g., another MFP). The extracting unit 903 detects identification information and second orientation information about the image data. The acquiring unit 904 acquires a rotation angle of the image data based on the second orientation information and first orientation information having been stored in the HDD 110 as being mapped to the identification information detected. The acquiring unit 904 acquires a rotation angle as described above. The communication control unit 118 transmits the rotation angle and position information having been stored in the HDD 110 as being mapped to the identification information to the external device, and requests the external device to output second processed image data. The second processed image data is generated by modifying the confidential image portion, which is specified by the position information and the rotation angle, of the image data.

Figure 13:
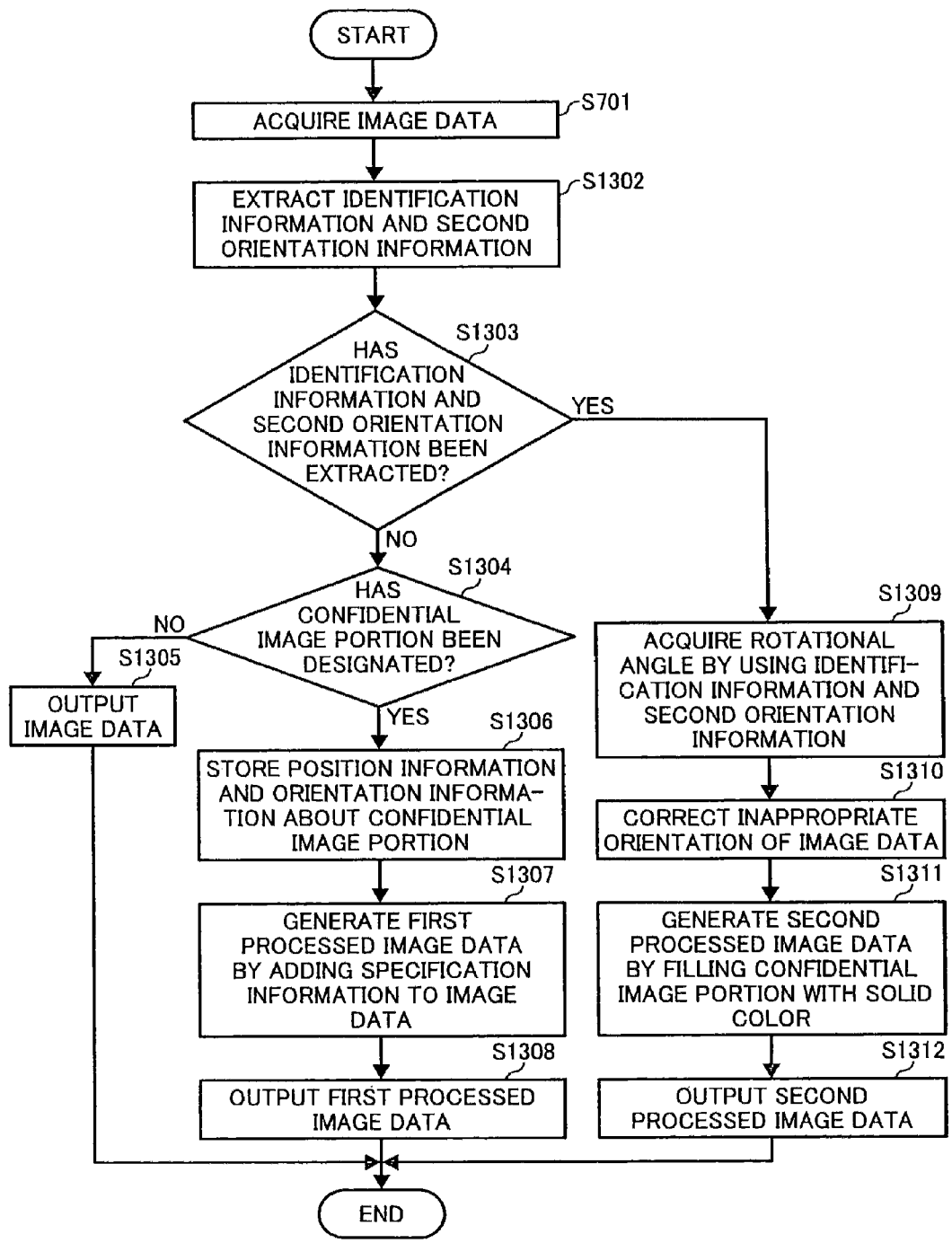
FIG. 13 is a flowchart for explaining how the MFP according to the second embodiment performs printing.

FIG. 13 is a flowchart for explaining how the MFP 900 performs printing. Because a printing procedure for the MFP 900 is substantially the same as that for the MFP 100, repetitive description will be omitted.

When a confidential image portion is designated by a user (YES at Step S1304), the receiving unit 906 maps position information about the designated confidential image portion and first orientation information to identification information, and stores these information pieces in the HDD 110 (Step S1306). The adding unit 902 generates first processed image data by adding the identification information and the first orientation information to the image data (Step S1307). The printer 105 outputs the first processed image data as a printout on a printing medium (Step S1308).

The extracting unit 903 extracts identification information and second orientation information from acquired image data (Step S1302). When the extracting unit 903 extracts identification information and second orientation information from the image data (YES at Step S1303), the acquiring unit 904 acquires a rotation angle of the image data based on the second orientation information and the first orientation information having been stored in the HDD 110 as being mapped to the identification information (Step S1309). The correcting unit 905 corrects inappropriate orientation of the image data based on the rotation angle (Step S1310). The modifying unit 907 generates second processed image data by modifying (filling with solid color) the confidential image portion specified by the position information having been stored in the HDD 110 as being mapped to the detected identification information (Step S1311).

In this manner, according to the second embodiment, a rotation angle of image data is acquired based on second orientation information, which is a detected value. A confidential image portion of the image data is modified after inappropriate orientation of the image data is corrected based on the rotation angle. Accordingly, even when first orientation information about image data with which identification information has been generated and the second orientation information, which is the detected information about the image data, differ from each other, the confidential image portion can be accurately modified. Put another way, the confidential image portion for which designation is received when the identification information is added to the image data is accurately modified.

A modification of the second embodiment will be described below. Because the structure and functions of an MFP according to this modification are substantially the same as those of the second embodiment, only elements that differ from those of the first embodiment will be described. The MFP according to this modification adds, to image data, a background pattern that has position information about a confidential image portion of the image data and orientation information about the image data as specification information. The MFP according to this modification provides substantially the same advantages as those of the second embodiment.

The generating unit 901 generates specification information that has position information about a confidential image portion of image data and first orientation information about the image data. In this modification, the generating unit 901 generates a background pattern as the specification information. More specifically, the generating unit 901 generates the background pattern that has an orientation indicating pattern that represents the first orientation information, and a basic pattern and an altered pattern that represent the position information. The generating unit 901 stores the first orientation information in the HDD 110.

As in the case of the second embodiment, the adding unit 902 generates first processed image data by adding the background pattern that includes the basic pattern and the altered pattern to the image data.

As in the case of the second embodiment, the extracting unit 903 detects the basic pattern, the altered pattern, and the orientation indicating pattern by using pattern images stored in the HDD 110 in advance.

The extracting unit 903 extracts, or detects, second orientation information from the orientation indicating pattern, in addition to the position information about the confidential image portion. The second orientation information can be extracted by the same method as that employed in the second embodiment.

The acquiring unit 904 acquires a rotation angle of the image data based on the second orientation information and the first orientation information having been stored in the HDD 110 as being mapped to the position information about the confidential image portion. The correcting unit 905 corrects inappropriate orientation of the image data based on the rotation angle.

A third embodiment of the present invention will be described below. Because the structure and functions of the MFP 900 according to the third embodiment are substantially the same as those of the MFP 900 according to the second embodiment, only elements that differ from those of the second embodiment will be described. The MFP 900 according to the third embodiment cancels output of image data when the MFP 900 determines that an orientation indicating pattern detected in a background pattern, which is generated as specification information, matches none of pattern images. The pattern images are images of orientation indicating patterns each of which is rotated by a predetermined angle. Accordingly, even when an original is inappropriately oriented by malicious intention, the MFP 900 according to the third embodiment cancels output of image data obtained by scanning of the original. Hence, the MFP 900 according to the third embodiment is capable of further reducing risk of information leakage.

Figure 14:
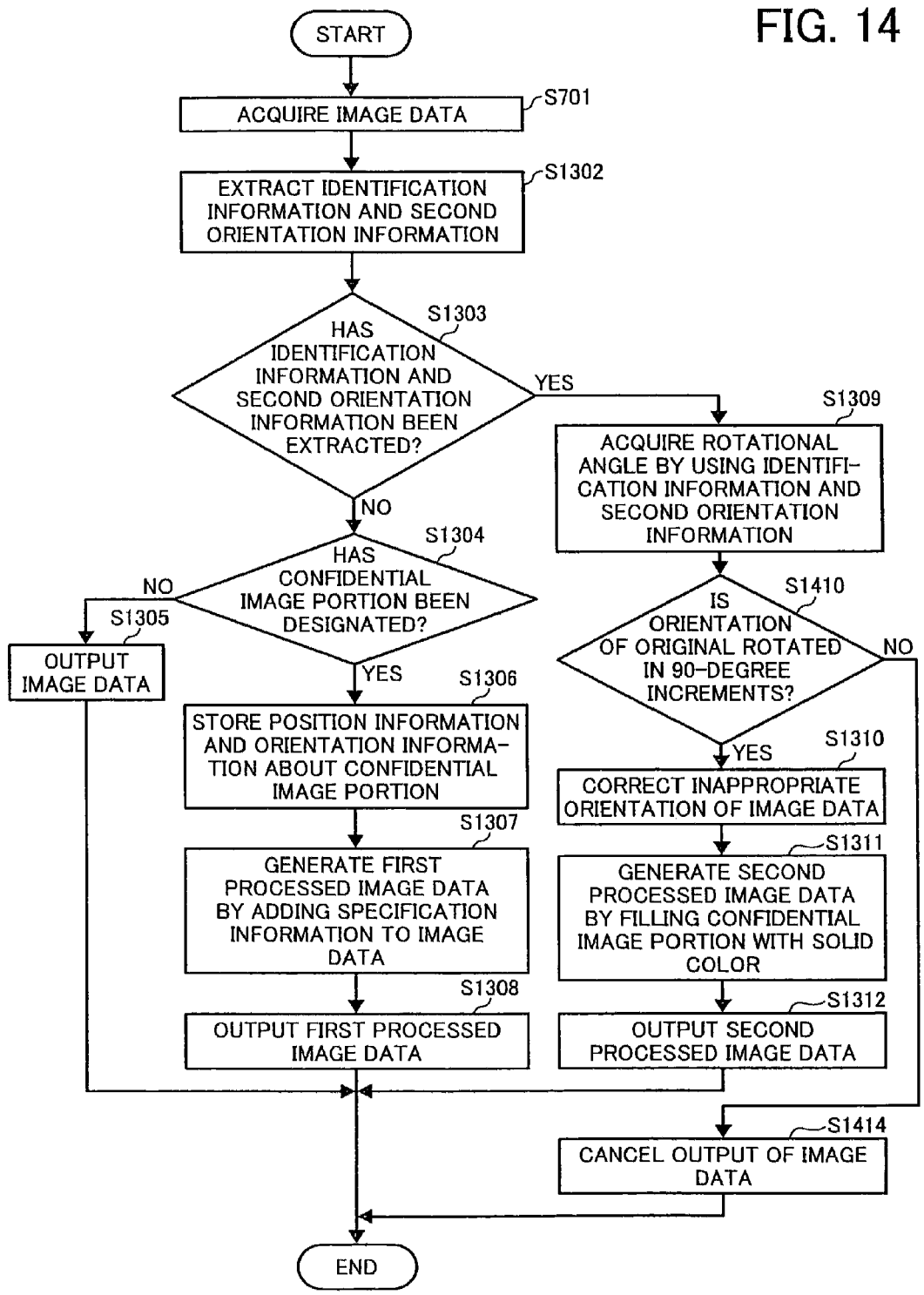
FIG. 14 is a flowchart for explaining how an MFP according to a third embodiment of the present invention performs printing.

How the MFP 900 according to the third embodiment performs printing will be described. FIG. 14 is a flowchart for explaining how the MFP 900 performs printing. Because a printing procedure for the MFP 900 according to the third embodiment is substantially the same as that for the MFP 900 according to the second embodiment shown in FIG. 13, repetitive description will be omitted.

The extracting unit 903 determines whether a detected orientation indicating pattern matches one of the pattern images (Step S1410) for determination as to whether to modify a confidential image portion. The pattern images are images of orientation indicating patterns rotated by predetermined angles; in this embodiment, in 90-degree increments. The predetermined angles are possible rotation angles of an original that is appropriately placed in the scanner 101 for scanning. When the detected orientation indicating pattern matches one of the pattern images (YES at Step S1410), processing proceeds to processes to be performed by the acquiring unit 904 and the correcting unit 905. When the detected orientation indicating pattern matches none of the pattern images (NO at Step S1410), output of the image data is cancelled (Step S1414). In place of cancellation of output of the image data, the modifying unit 907 can modify a whole area of the image data.

A fourth embodiment of the present invention will be described below. Because the structure and functions of the MFP 900 according to the fourth embodiment are substantially the same as those of the MFP 900 according to the second embodiment or the third embodiment, only elements that differ from those of one of these embodiments will be described. The MFP 900 according to the fourth embodiment cancels output of image data when the MFP 900 determines that an original has not been fed to a scanning position by the ADF (not shown) of the scanner 101. Accordingly, even when an original is inappropriately oriented by malicious intention, the MFP 900 according to the fourth embodiment cancels output of image data obtained by scanning of the original. Hence, the MFP 900 according to the fourth embodiment is capable of further reducing risk of information leakage.

Figure 15:
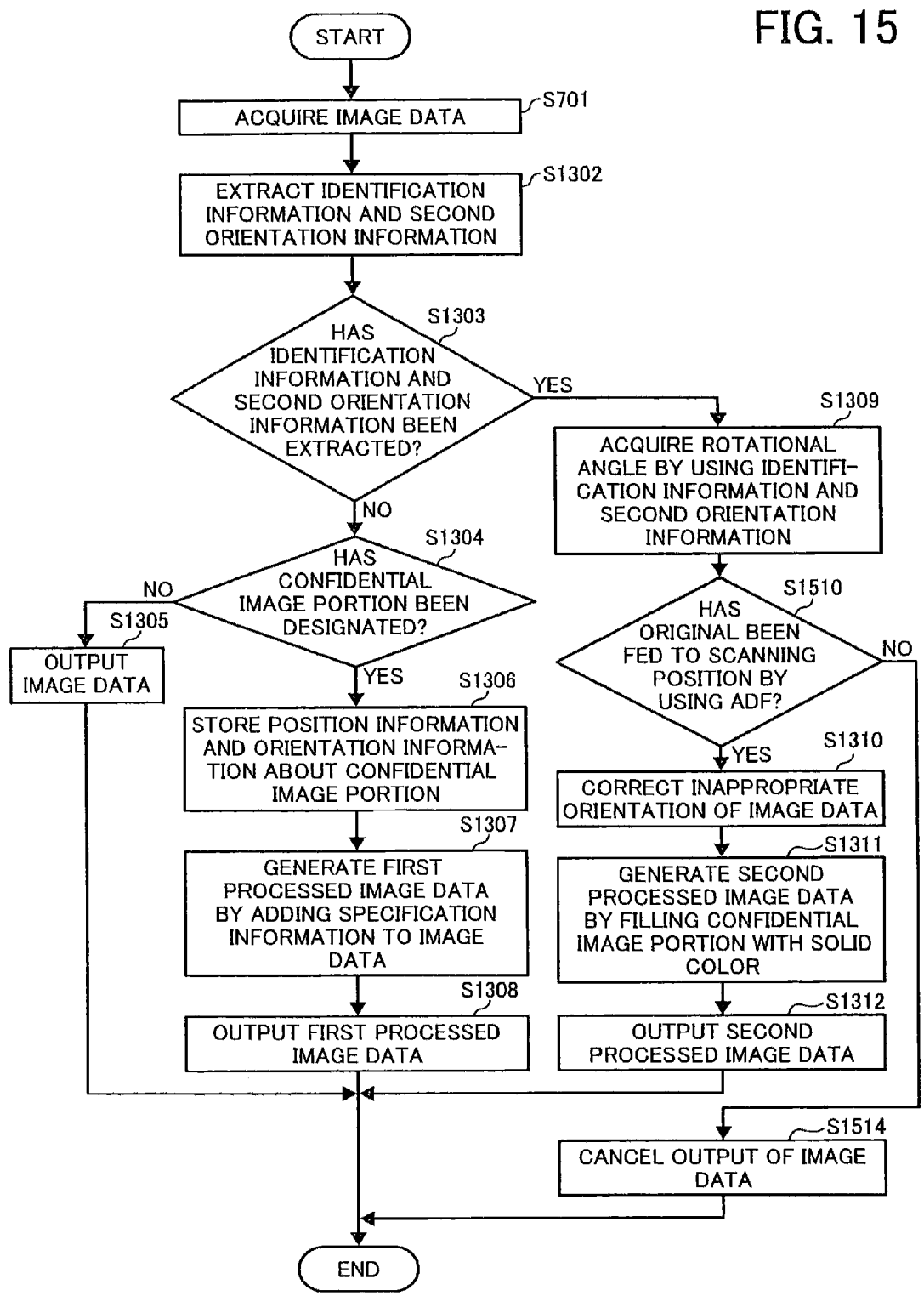
FIG. 15 is a flowchart for explaining how an MFP according to a fourth embodiment of the present invention performs printing.

How the MFP 900 according to the fourth embodiment performs printing will be described. FIG. 15 is a flowchart for explaining how the MFP 900 performs printing. Because a printing procedure for the MFP 900 according to the fourth embodiment is substantially the same as that for the MFP 900 according to the third embodiment shown in FIG. 14, repetitive description will be omitted.

The extracting unit 903 according to the fourth embodiment determines whether the ADF has been used to feed an original to the scanning position in the scanner 101 (Step S1510) for determination as to whether to modify a confidential image portion. More specifically, the extracting unit 903 determines whether the system control unit 104 has issued a command to cause the ADF to feed the original to the scanning position, and determines, based on a result of the determination, whether the ADF has fed the original to the scanning position. When the extracting unit 903 determines that the ADF is used to feed the original (YES at Step S1510), processing proceeds to processes to be performed by the acquiring unit 904 and the correcting unit 905. When the extracting unit 903 determines that the ADF was not used to feed the original (NO at Step S1510), output of the image data is cancelled (Step S1514). In place of cancellation of output of the image data, the modifying unit 907 can modify a whole area of the image data.

A fifth embodiment of the present invention will be described below. Because the structure and functions of the MFP 900 according to the fifth embodiment are substantially the same as those of the MFP 900 according to the second embodiment, the third embodiment, or the fourth embodiment, only elements that differ from those of one of these embodiments will be described. The MFP 900 according to the fifth embodiment cancels output of image data or modifies the whole area of image data when the MFP 900 detects an orientation indicating pattern in a background pattern superimposed on the image data as specification information other than a predetermined position. Accordingly, even when an original is inappropriately oriented by malicious intention, the MFP 900 according to the fifth embodiment cancels output of image data obtained by scanning of the original. Hence, the MFP 900 according to the fifth embodiment is capable of further reducing risk of information leakage.

Figure 16:
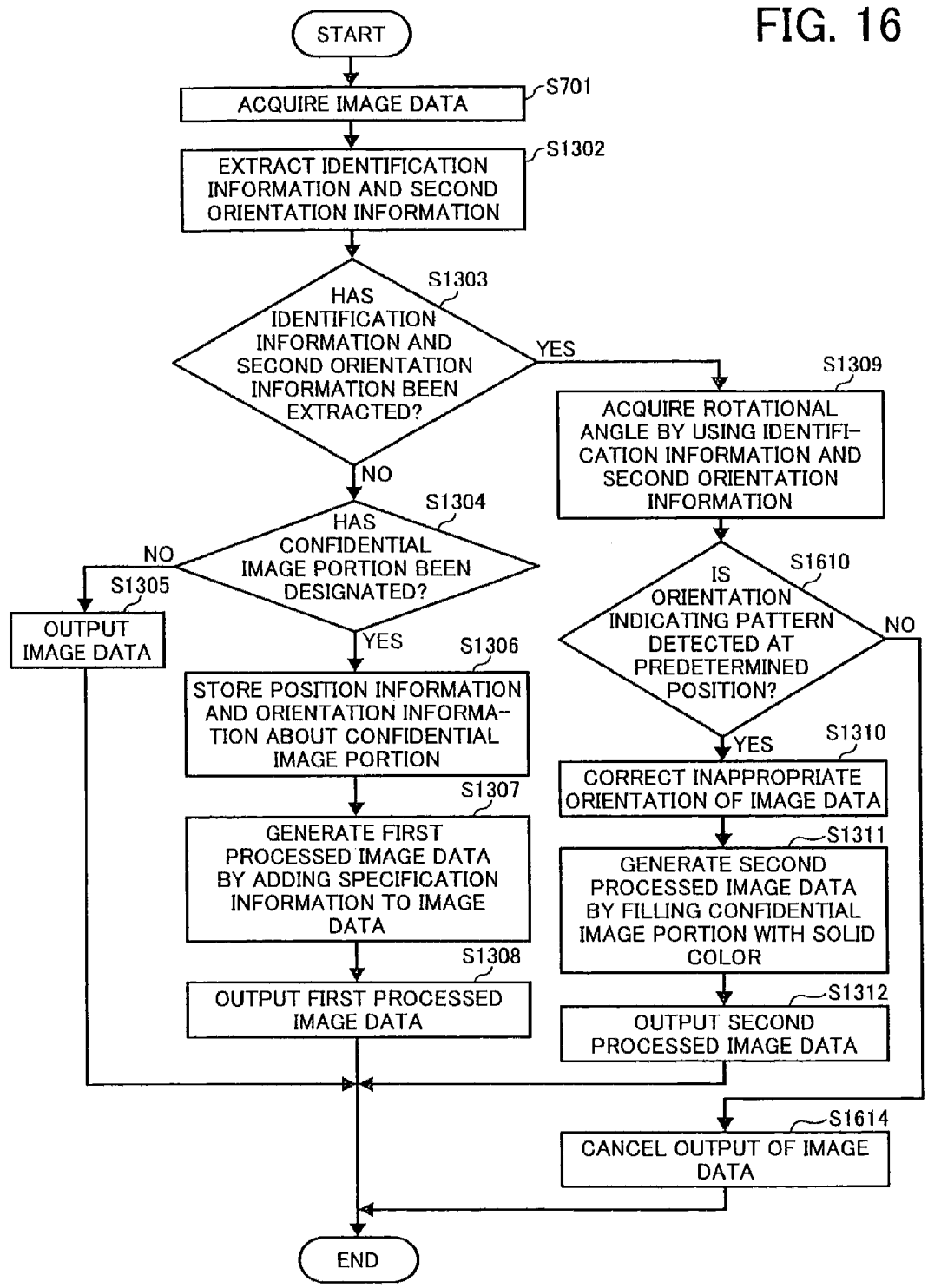
FIG. 16 is a flowchart for explaining how an MFP according to a fifth embodiment of the present invention performs printing.
Figure 17A:
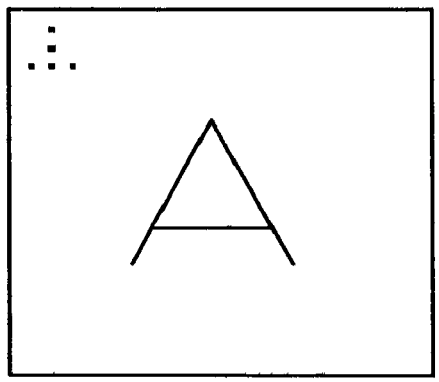
FIGS. 17A to 17D are examples of orientation indicating patterns each of which is to be detected at the upper left corner of image data.
Figure 17B:
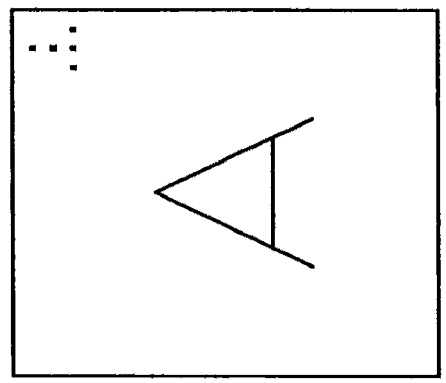
Figure 17C:
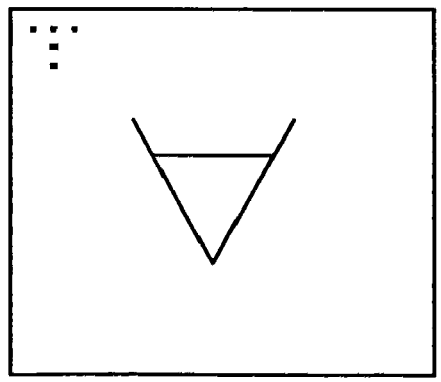
Figure 17D:
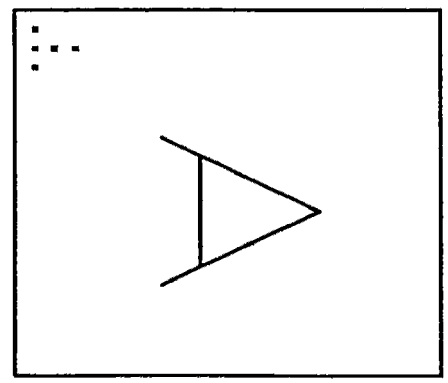

How the MFP 900 according to the fifth embodiment performs printing will be described. FIG. 16 is a flowchart for explaining how the MFP 900 according to the fifth embodiment performs printing. Because a printing procedure for the MFP 900 according to the fifth embodiment is substantially the same as that for the MFP 900 according to the third embodiment shown in FIG. 14 or the fourth embodiment shown in FIG. 15, repetitive description will be omitted.

The extracting unit 903 determines whether an orientation indicating pattern in a background pattern of image data is detected at a predetermined position (e.g., the upper left corner of the image data) (Step S1610). The predetermined position can be arbitrarily set by a user. The extracting unit 903 detects the orientation indicating pattern by pattern matching of the orientation indicating pattern at the predetermined position against pattern images stored in the HDD 110, or the like. FIGS. 17A to 17D are examples of orientation indicating patterns each of which is to be detected at the upper left corner of image data. When an orientation indicating pattern is detected at the predetermined position (YES at Step S1610), processing proceeds to processes to be performed by the acquiring unit 904 and the correcting unit 905. When an orientation indicating pattern is not detected at the predetermined position (NO at Step S1610), output of the image data is cancelled (Step S1614). In place of cancellation of output of the image data, the modifying unit 907 can modify a whole area of the image data.

The features of the MFP according to one of the embodiments and modifications can be implemented by a server. The server can include a storing unit, an extracting unit, an acquiring unit, and a transmitting unit. The storing unit stores therein position information about a confidential image portion of image data, first orientation information about the image data, and identification information by which the image data can be identified. These information pieces are mapped to each other. When the server receives image data from an external device, the extracting unit extracts identification information and second orientation information from the image data. The identification information is mapped to the position information. The acquiring unit acquires a rotation angle of the image data based on the second orientation information and the first orientation information stored in the storing unit as being mapped to the identification information. The transmitting unit transmits the position information, which stored in the storing unit as being mapped to the identification information, and the rotation angle to the external device, and requests the external device to output second processed image data. The second processed image data is generated by modifying the confidential image portion, which is specified by the position information and the rotation angle, of the image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus configured to process image data that contains a confidential image portion, the image data including specification information about the confidential image portion, the image processing apparatus comprising:

an extracting unit configured to extract the specification information from the image data;

a modifying unit configured to generate second processed image data by modifying the confidential image portion specified by the specification information extracted by the extracting unit;

an output unit configured to output the second processed image data;

a storing unit configured to store therein first orientation information;

an acquiring unit configured to acquire a rotation angle pertaining to the image data; and a correcting unit configured to correct inappropriate orientation of the image data, wherein the specification information extracted by the extracting unit is position information about the confidential image portion and second orientation information about the image data, the acquiring unit is configured to acquire the rotation angle based on the second orientation information and the first orientation information, the correcting unit is configured to correct orientation of the image data by an angle corresponding to the rotation angle, and the modifying unit is configured to generate the second processed image data by modifying the confidential image portion, specified by the position information, of the image data having undergone correction performed by the correcting unit.

2. An image processing apparatus that processes image data that contains a confidential image portion, the image data including specification information about the confidential image portion, the image processing apparatus comprising:

an extracting unit configured to extract the specification information from the image data;

a modifying unit configured to generate second processed image data by modifying the confidential image portion specified by the specification information extracted by the extracting unit;

an output unit configured to output the second processed image data; and a storing unit configured to store therein identification information and position information about the confidential image portion, the identification information and the position information being mapped to each other, wherein the specification information is the identification information, the extracting unit is configured to extract the identification information from the image data, and the modifying unit is configured to generate the second processed image data by modifying the confidential image portion specified by the position information.

3. The image processing apparatus according to claim 2, wherein the identification information is information for identification of the image data.

4. The image processing apparatus according to claim 2, wherein the identification information is information for identification of the confidential image portion.

5. The image processing apparatus according to claim 2, further comprising:

an acquiring unit configured to acquire a rotation angle pertaining to the image data; and a correcting unit configured to correct inappropriate orientation of the image data, wherein the storing unit is configured to store therein the position information and first orientation information about the image data, the position information and the first orientation information being mapped to each other, the specification information is the identification information and second orientation information detected by the extracting unit, the acquiring unit is configured to acquire the rotation angle based on the second orientation information and the first orientation information, the correcting unit is configured to correct the inappropriate orientation of the image by a degree corresponding to the rotation angle, and the modifying unit is configured to generate the second processed image data by modifying the confidential image portion, specified by the position information, of the image data having undergone correction performed by the correcting unit.

* * * * *